United States Patent [19]

Roggendorf

[11] Patent Number: 4,882,783
[45] Date of Patent: Nov. 21, 1989

[54] PRE-RECORDED MAGNETIC VIDEO TAPE HAVING AN INFORMATION CODE ON THE SYNCHRONIZATION TRACK

[75] Inventor: Peter Roggendorf, Mainz-Kostheim, Fed. Rep. of Germany

[73] Assignee: GSE Electronic Systems, Inc., Salt Lake City, Utah

[21] Appl. No.: 82,790

[22] Filed: Aug. 6, 1987

Related U.S. Application Data

[62] Division of Ser. No. 3,932, Jan. 16, 1987, Pat. No. 4,703,311.

[30] Foreign Application Priority Data

Jun. 9, 1986 [DE] Fed. Rep. of Germany ....... 3619359

[51] Int. Cl.$^4$ ............................................ G11B 27/10
[52] U.S. Cl. ..................... 360/134; 360/14.2
[58] Field of Search ......................... 360/13, 14.1–14.3, 360/72.1, 72.2, 74.4, 85, 95, 134, 37.1

[56] References Cited

U.S. PATENT DOCUMENTS

| | | | |
|---|---|---|---|
| 4,167,028 | 9/1979 | Tobey | 360/72.2 |
| 4,378,577 | 3/1983 | Chamberlin | 360/72.2 |
| 4,641,208 | 2/1987 | Inazawa et al. | 360/72.2 |
| 4,707,749 | 11/1987 | Nishijima et al. | 360/14.3 |
| 4,734,792 | 3/1988 | Maeda et al. | 360/14.2 |

FOREIGN PATENT DOCUMENTS 0034633 7/1982 Japan .

Primary Examiner—Stuart N. Hecker
Assistant Examiner—David J. Severin
Attorney, Agent, or Firm—Peter K. Kontler

[57] ABSTRACT

A method for transferring an information code onto the synchronization track of a video tape is described. The code is recorded during intervals between synch pulses by adding code pulses of the same magnetization as the recorded synch pulses to the synchronization track. The code pulses, at least in part, overlap the synch pulses with the length of the code pulses representing binary values. With this technique, an erasure of pre-recorded synch pulses is not required. A recording device is used that contains a generator of code pulses and at least two timing elements which are set when a synch signal is produced in response to a detected synch pulse. One of the timing elements operates a mode changeover switch and the other activates the code pulse generator. A reading device is used and contains two threshold detectors which detect two synch signals, representative of the beginning and end of the recorded synch signals. At least one timing element is started at the beginning of the synch signal. A code evaluation circuit is used to determine if the end of the synch signal appeared during the running period of the latter timing element or after it. A pre-recorded video tape carries twice-magnetized sections on its synchronization track. Each such section has a length at most about that of the synch pulse recording and is followed by a once-magnetized having one of two different lengths, both preferably being shorter than the synch pulse recording itself.

7 Claims, 3 Drawing Sheets

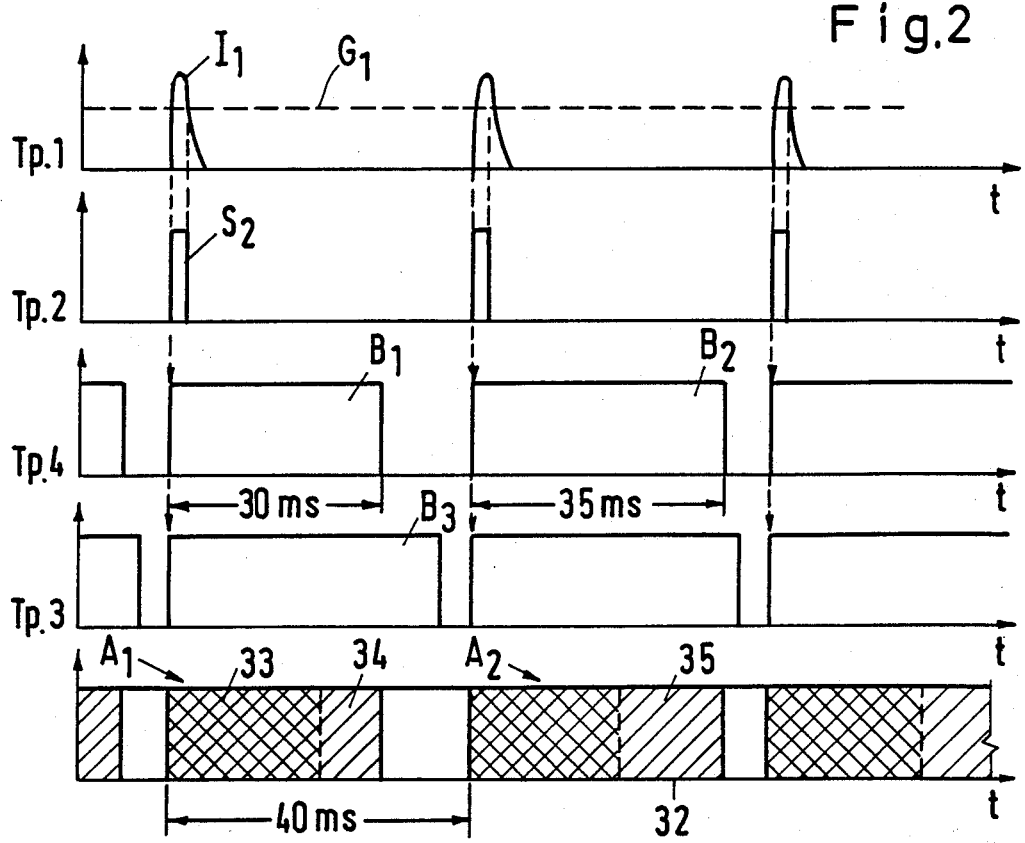
Fig. 2
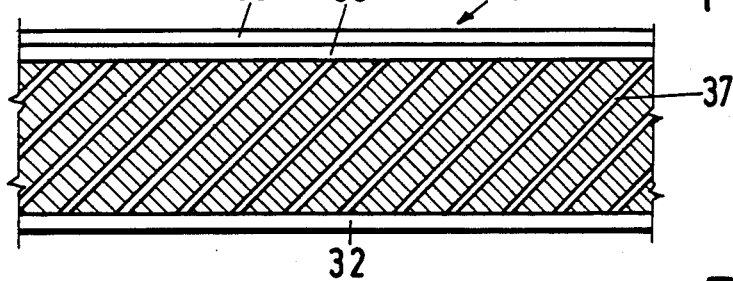
Fig. 4
Fig. 5
| Codeword 50 bit |||||||||||
|---|---|---|---|---|---|---|---|---|---|---|
| S | D |||||||||  E |
|  | 1 Std. | 10 min. | 1 min. | 10 sec. | 1 sec. | Ident. 10 | Ident. 1 | User 10 | User 1 |  |
| 8 bit | 4 bit | 4 bit | 4 bit | 4 bit | 4 bit | 4 bit | 4 bit | 4 bit | 4 bit | 6 bit |
| 1.-8. | 9.-12 | 13.-16 | 17.-20 | 21.-24 | 25.-28 | 29.-32 | 33.-36 | 37.-40 | 41.-44 | 45.-50. |
—— 2 sec ——

PRE-RECORDED MAGNETIC VIDEO TAPE HAVING AN INFORMATION CODE ON THE SYNCHRONIZATION TRACK

The application is a division of application Ser. No. 003,932 filed Jan. 16, 1987, and now U.S. Pat. No. 4,703,311.

FIELD OF THE INVENTION

This invention relates to a method and apparatus for transferring an information code onto the synchronization track of a video tape employing prerecorded synchronization pulses, and to a video tape produced according to said method.

BACKGROUND OF THE INVENTION

In the method that is already known from German Patent Publication DE-PS 33 09 029, a time code is recorded on the synchronization track of a video tape in such a way that, at a given time, a preset number of synchronization (synch) pulses is combined to form a data block assigned to a certain section of the tape. The synch pulses of each of the data blocks are coded and recorded with an information content for a specific tape section in such a way that, during replay of the tape, the synch pulses may be retrieved from the coded data blocks. The synch pulse may, for instance be coded by means of pulse-polarity modulation, by width-modulation, or by frequency modulation. In any one of such procedures, any pulses that already were pre-recorded on the synchronization track will be replaced by the recording of a coded pulse. This means that, in the case of a later coding those synch pulses that were already pre-recorded at an earlier time will have to be first erased. Such erasure, when limited to the synchronization track, represents a complex procedure and involves the hazard of affecting any video signal that was already recorded on the tape.

SUMMARY OF THE INVENTION

The present invention permits the subsequent coding on the syncronization track of a pre-recorded video tape without requiring an erasure of earlier recorded synch pulses on that track.

In accordance with one technique of the presented invention, such coding is obtained by the recording of pulse width modulations on the synchronization track between successive synch pulses with magnetically recorded code pulses that are longer than the synch pulses. Such subsequent recording is effected by means of additional code pulses whose direction of magnetization is the same as the synch pulses so that their respective magnetizations are additive. Since the code pulses magnetize the synchronization track in the same fashion as the synch pulses, the code pulses may at least in part overlap the existing synch pulses.

The additional code pulses extend the synch pulse recordings in accordance with desired binary values. An overlap is advantageous in order to obtain a continuous recording of each code pulse. The fact that, in this process, the track of the synch pulse recording will be magnetized for a second time, does not harm any subsequent track reading process. This is because the first magnetic recording of the synch pulses already reached a degree of saturation or came close to it, so that subsequent magnetizing in the same direction will not lead to a significant change of state.

Since an erasure is not required, the method of recording code pulses may be effected without any problems. There also will be no risk of affecting any prerecorded video signals. Another benefit is seen in the fact that such subsequently coded video tapes may be replayed on conventional video recorders (albeit without evaluation of the coded information), because one of the ends of the synch pulse recording, i.e., preferably the front end, may continue to be used for obtaining a synchronization signal.

In a preferred embodiment, the beginning of the magnetic synch pulse is detected and the additional code pulse is recorded in response to the moment of this detection. The recording of the code pulse is terminated after a first or second binary value determining delay time.

These two delay times may be sufficiently different from each other. At normal tape speed, a new synch pulse will occur or commence at regular intervals every 40 ms. (for PAL) or 33.3 ms. (for NISC) and will last for about 20 ms. or 16.7 ms., respectively. Under these conditions, an extension of the synch pulse recording periods from about 10 ms. or 15 ms., respectively, will suffice to properly identify the binary value represented by the code pulse.

In a read mode, it is advantageous that a synch signal is obtained from the start or initial signal that appears at the magnetic head, namely, the signal occurring at the beginning of the magnetic pulse recording of the synch pulse, and that the end of the magnetic pulse during the interval bounded by this synch pulse recording is detected by sensing an opposite polarity output from the magnetic head. This end detection represents the code signal. The time difference between the detection of the synch signal and the code signal is used to determine the bit value represented by the code signal. The determination of different binary bit values may be achieved in an uncomplicated way from the relationship between the synch signals and the code signals.

In this context, it is of particularly advantage to evaluate the time difference between the code signal and the next successively occurring synch signal, i.e. the synch signal occurring at the end of the interval. This time difference is shorter than the time difference between the preceding synch signal and the end of the code signal following thereafter, thus allowing an easier and more accurate binary bit evaluation.

It is also advantageous and an aspect of the invention that the detection of a code signal initiates first the generation of two different time window pulses and then a determination of whether and in which one of these time windows pulses the next successive synch pulse occurs. The time window pulses are time limited in both directions so as to offer the benefit that any pulses occurring outside these windows will remain unnoticed.

One apparatus for carrying out a method in accordance with this invention uses a read-write magnetic head and a read-write mode changeover switch. The device comprises a threshold detector for the detection of the beginning of the synch pulse recording and the subsequent generation of a synch signal indicative thereof. A generator is used to produce a code pulse for recording in response to a synch signal. Two timing elements are activated by the detected pulse synch. One of the time elements temporarily sets the changeover switch from a read mode to a write mode, and the other element cuts off the code pulse to be recorded upon expiration of either one of two delay periods.

The apparatus as described above is used for recording code pulses on the synchronization track of a video magnetic tape on which track synch pulses already exist. Although pre-recorded synch pulses are used to synchronously trigger the timing elements, the synch pulses remain unaffected on the synchronization track. When the code pulse information is then recorded, the changeover switch is operated in such manner as to ensure that the additional magnetization for the additional code pulses can take place.

In a preferred form of execution of such apparatus, the generator for the additional code pulses is provided with an electronic switch to connect a voltage to the magnetic head while one of the timing elements during its delay period causes a closure of the switch in response to the detected synch signal and opens it again at the end of the delay period. This arrangement constitutes a convenient way to carry the additional code pulses to the magnetic head.

A further advantage is seen in the presence of a second switch connecting the magnetic head supply line, alternatively with respect to the first switch, to ground. In this way, a distinct demarcation of the magnetically recorded coded pulses is achieved.

A preferred version of the read-write mode changeover switch is in an electronic form that is triggered by means of a control pulse or voltage generated by a first timing element. It is further recommended that the mode changeover switch be integrated into the assembly containing the read-write magnetic head, an amplifier and a threshold detector used to detect the synch signal. Because of its electronic actuation, the mode switch is capable of handling the required rapid changeover operations.

One apparatus for practicing the method of the invention also has two threshold detectors which are used for the separate detection of the beginning and end of the recorded magnetic pulses and for the generation of synch signals and code signals. At least one timing element is used at the occurrence of these signals with a code evaluation circuit to determine whether the other signal is present during or after the running period of the timing element.

Such latter apparatus is used to read the binary values of the recorded coded pulses. The synch signals, originally intended to control synchronization, are used to trigger the timing element. By combining the time-sequenced appearance of the synch signal and the code signal, specific binary values may be determined.

It is particularly advantageous to use, during the read mode, two timing elements, each with a different running time and which are activated at the rise of one signal detected from the synch track. The code evaluation circuit then determines whether the other signal is present during the running time of one or both timing elements. In this way, two adjacent time windows are obtained, one of which is formed by the output pulse or running period of one timing element and the other of which is defined by the difference of the running periods or output pulses of both timing elements.

For a specific embodiment described herein, it is recommended that each timing element used in the read circuit is made from a monoflop and that the code evaluation circuit comprises two JK-flip-flops, either one being prepared through the output signal of one monoflop and being set by means of the output signal from a threshold detector for a synch track detected signal. In addition, a logic circuit is used to poll the flip-flop outputs. Such monoflops and flip-flops may be easily manufactured in the form of integrated circuits. A microprocessor, for example, may be used for the logic circuit.

It is particularly advantageous to vary the running period (output pulse) of at least one timing element that is assigned to the code evaluation circuit so that smaller or larger values can be set electronically. This feature will allow a higher tape speed to reduce the reading time of the information and/or to obtain a controlled and faster access to a certain section of the video tape.

Another advantage is achieved with a common threshold detector that sends a synch signal not only to the timing element controlling the additional pulse generator, but also to at least one of the timing elements that are assigned to the code evaluation circuit. If the recording equipment also contains a reading device, the use of a common threshold detector offers a cost-saving benefit.

A pre-recorded video tape in accordance with the invention is characterized in that its synchronization track has, for the purpose of recording coded pulses, been provided with twice-magnetized sections each at most of about the length of the synch pulse recordings and followed by once-magnetized sections of either of two different lengths. These lengths can be shorter than the recorded synch pulses. Such video tape may be pre-recorded in a conventional way and subsequently provided with a coding in accordance with the invention. Yet, in spite of such coding, it is still possible to play the tape back on a conventional video recorder.

It is also recommended that the binary values marked by the recorded length of the coded pulses form an information code data block. This includes a predetermined number of code pulse. Hence, the evaluation of the coded pulse recording will produce an information code which can contain a variety of information, particularly concerning the actual tape section as well as the direction of travel of the tape.

The invention will hereafter be explained with the help of a preferred embodiment as shown in the drawings.

BRIEF DESCRIPTION OF THE DRAWINGS

FIG. 2 is a timing diagram of voltages at test points of the reading device;

FIG. 4 is a schematic rendition of a pre-recorded video tape; and

FIG. 5 is a schematic rendition of an example of an information code data block.

DETAILED DESCRIPTION OF THE DRAWINGS

Figure 1:
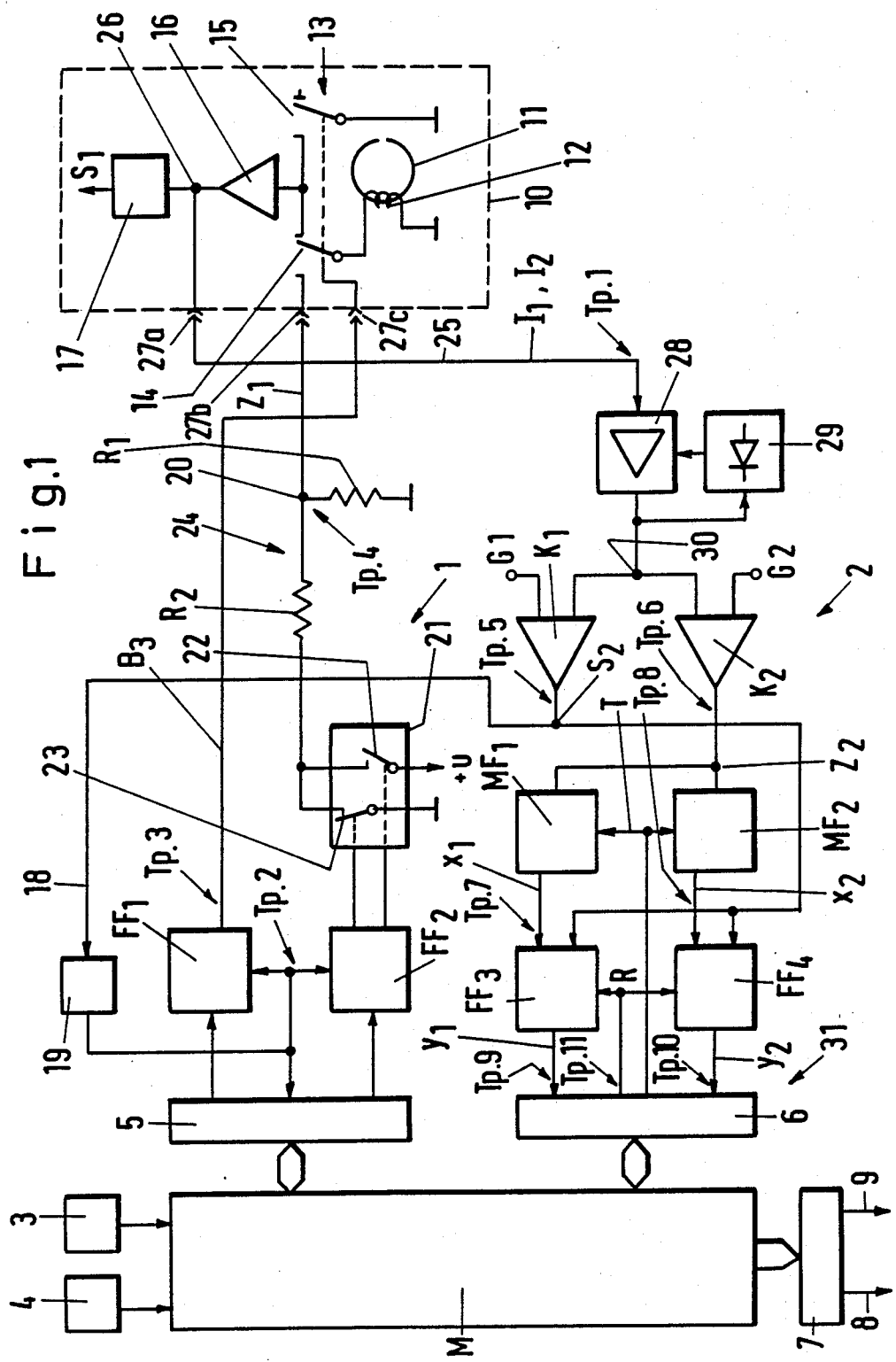
FIG. 1 is a schematic representation of a combined recording and reading device according to the invention for a video recorder.

FIG. 1 shows an aggregate recording device 1 and reading device 2, both being controlled by a microprocessor M. The microprocessor comprises, as is common, a central processing unit (CPU), a clock pulse generator, a read-only memory (ROM), a variable memory (PROM), a data bus, an address bus, and a control bus. The recording device possesses an input device 3 as, for instance, a keyboard, and an indication device 4 as, for instance, a display. The microprocessor M is connected to the recording device 1 via the interface 5, to the reading device 2 via the interface 6 and, via the interface 7, to a control channel 8 leading to a video player and a control channel 9 leading to a video recorder. These control channels may be realized by electrical connections, infrared transmission systems or the like.

A component assembly 10 as used, for example in a video recorder, comprises a read-write magnetic head 11 with an appurtenant coil 12, an electronically-controlled mode changeover switch 13 controlling two switch paths 14 and 15, an amplifier 16 and a threshold detector 17. Detector 17 produces a response when a predetermined positive threshold level is exceeded, namely, when at the beginning of a magnetic recording, a positive start signal is presented at the output of coil 12, whereupon a synchronous signal S1 to control the tape speed of the video recorder is released.

In a similar way—as will be explained later on—a second synch signal S2 is obtained and coupled, via line 18 and a noise blanking logical circuit 19, to interface 5 and, depending upon delay controls from microprocessor M, eventually to the outputs of two timing elements, i.e., flip-flops FF1 and FF2. The delay period for both flip-flops is preset and controlled by microprocessor M.

Flip-flop FF1 controls the changeover switch 13. When enabled, the changeover switch will go from the read mode position shown here in FIG. 1, in which the coil 12 is connected to the amplifier 16, to the other position for a write mode. In the write mode, the input to amplifier 16 is connected to ground potential and coil 12 is connected to a junction 20 in a voltage divider consisting of resistors R1 and R2. The voltage divider forms, together with a switching device 21 containing two switches 22 and 23, a generator 24 for additional code pulses Z1 which are made available at junction 20 for recording by magnetic head 11.

Reading device 2 is connected, via line 25, to output 26 of amplifier 16. Thus, only three connections, namely 27a, 27b and 27c, are needed to connect the combined read-write device 1, 2 with the assembly 10 inside the video recorder. Line 25 carries start signals I1 and end signals I2, both being induced in coil 12 but respectively at the beginning and the end of a magnetic recording. These signals are amplified by an amplifier 28 that is controlled by a controller 29 and are coupled to the inputs of two threshold detectors K1 and K2. The other inputs of these detectors are each supplied with a limit or reference level G1 and G2, respectively.

Once the signal at the amplifier output 30 falls below the limit value G2, i.e., when the end signal I2 appears, the threshold detector K2 releases or generates a code signal Z2 which is coupled to the inputs of two single pulse generators or monoflops MF1 and MF2. These two monoflops differ in their running periods in the course of which they will send preparation or set pulses X1 and X2, respectively, to the preparation or set inputs of the JK-flip-flops FF3 and FF4, respectively. The outputs of monoflops FF3 and FF4 are signals Y1 and Y2 that occur in a manner so as to enable code evaluation by microprocessor M. Microprocessor M also sends an appropriate rest signal R to the flip-flops FF3 and FF4 and a fast-run signal T to reduce or vary the running times of the monoflops MF1 and MF2. Together, the flip-flops and the microprocessor form a code evaluation circuit 31.

With reference to FIG. 2, the operational principle of the device for recording an information code will be explained in detail. The induced start or synch signals I1 appear at the test point Tp1. From these signals, the threshold detector K1 generates synch signals S2. At normal tape speed, these signals are sequenced at a time separation interval of 40 ms. The leading edge of the synch signal triggers the flip-flops FF1 and FF2.

The second flip-flop FF2 is controlled by microprocessor M in such a way that FF2 causes a connection of the voltage divider R1, R2 to the voltage +U for a short or long period of time, in this case for 30 or 35 ms., depending on the desired binary value for the code pulse to be recorded on the tape. This will produce voltage pulses B1 and B2, respectively, at the test point Tp4, namely at the junction 20. Flip-flop FF1 generates voltage pulses B3 which cause the changeover switch 13 to be switched into a write-mode condition. Such switching operation occurs as soon as the induced start or synch signal I1 has been read or detected. The write mode as represented by pulse B3 will remain enabled for a somewhat longer period than the period of the voltage pulse B2; however, coil 12 can in any even be connected to ground by switch 23 at the end of pulse B3.

Resulting from the above are the recordings A1 and A2 found in the synchronization track 32 shown at the bottom of FIG. 2. In the area of the pre-recorded original synch pulse 33, a second magnetization will occur. Such twice-magnetized section is followed by a shorter section 34 or a longer section 35, both with single magnetization. The magnetization in all sections 33–35 has reached saturation or close to it. The recordings A1 and A2 differ in length from each other and mark the coded pulses B1 and B2.

Figure 3:
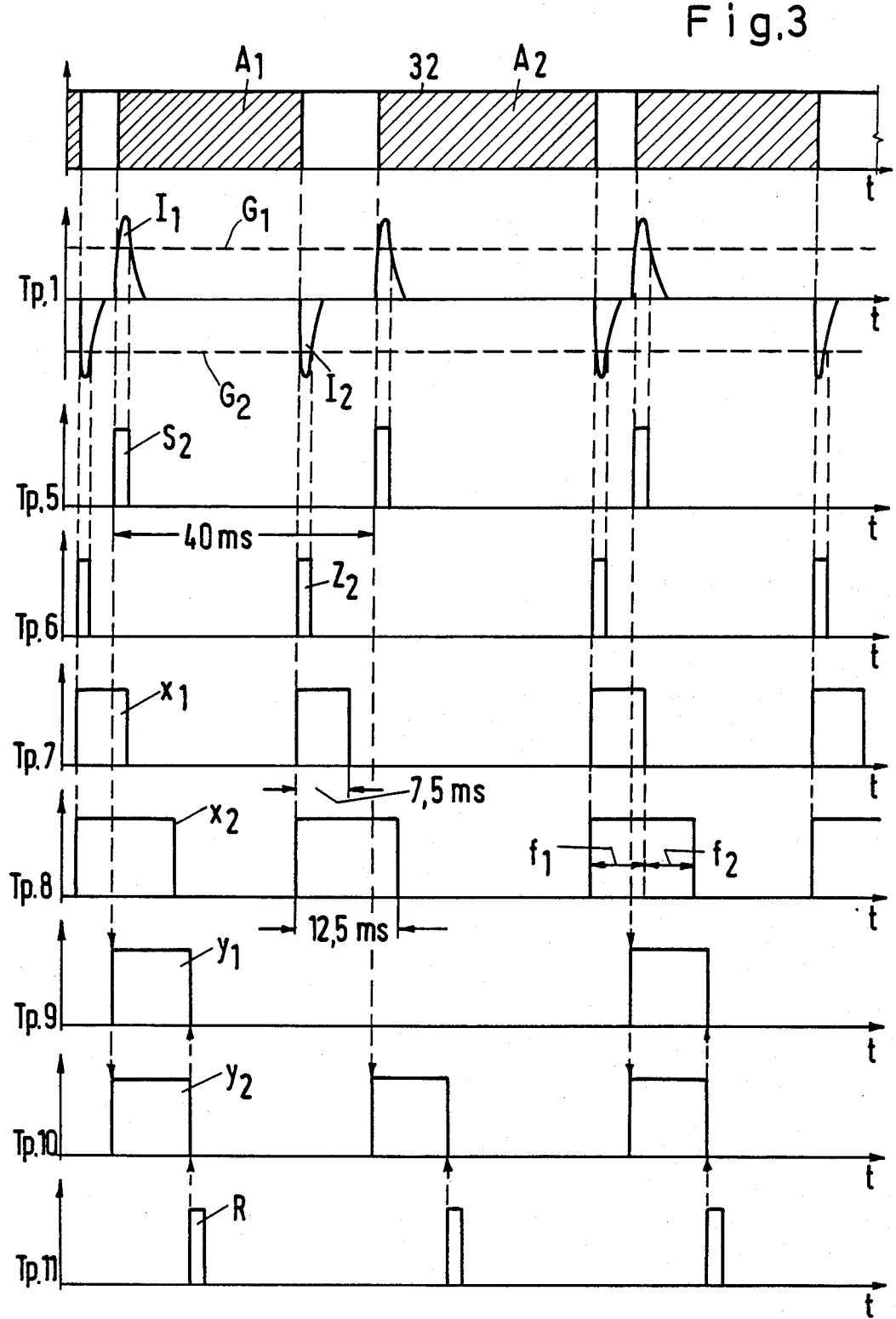
FIG. 3 is a timing diagram of voltages at test points of the reading device.

In the process of reading the recordings A1 and A2 shown once again at the top line of FIG. 3, the induced start signals I1 as well as the induced end signals I2 will appear at the test point Tp1, since the mode changeover switch 13 is not operated in dependence on the start signals I1 but in dependence upon the operation of FF2 which is controlled by processor M. In response to the signals appearing on line 25 at test point Tp1, the threshold detector K1 generates the synch signals S2 (at test point Tp5), and the threshold detector K2 generates the code signals Z2 (at test point Tp6).

The monoflops (monopulsers) MF1 and MF2 are triggered by code signals Z2 to generate output signals X1 and X2, respectively, which have durations of, say, 7.5 ms. and 12.5 ms., respectively (test points Tp7 and Tp8). Signals X1 and X2 are applied to JK-flip-flops FF3 and FF4 which are thus prepared to release output signals Y1 and Y2, respectively (test points Tp9 and Tp10), once synch signal S2 appears. These latter output signals are terminated by means of the reset signal R (test point Tp11) from processor M.

If the synch signal S2 arises a short time, equivalent to a small spatial tape distance, after the code signal Z2, the output signals Y1 and Y2 will both appear. If, on the other hand, the synch signal S2 occurs at a later time, equivalent to a larger tape distance, from code signal Z2, only the output signal Y2 will appear. In this manner the microprocessor M will be able to recognize the binary value represented by the specific combination of pulses Y1 and Y2.

This technique of binary value detection in effect produces two windows f1 and f2 during which the binary value is determined. If the threshold detector K2 should respond to a negative pulse outside these windows, such response and pulse are ignored.

FIG. 4 shows a video tape 36 containing helical-scan tracks 37, the synchronization track 32 and the audio-frequency tracks 38 and 39, all in conventional fashion.

The synchronization track 32, for example, may also contain an information code of the kind shown schematically in FIG. 5.

Assigned to each frame (or field) is a recording A1 or A2 from which a synch signal may be obtained and which also possesses a binary value. One information code consists of 50 bits or the time equivalent of 2 seconds in the case of full frames. The data block comprises a start section S and 8 bits and an end section E with 6 bits, both sections permitting the running direction of the tape to be detected. Between these sections there is a data field D containing hour units, minute tens, minute units, second tens, second units, a two-position identification code and a two-position user code. By changing the identification code, it is possible to assign a different meaning to the preceding data. The user code, for example, may be used to show the cassette number, the duplicating or re-recording firm or similar information. By virtue of the time information contained in the data block between the sections, it is possible to precisely define a certain position on the video tape and gain fast access to it. The data block may also contain information of a different kind such as a directory connector in series upstream of the time code, control instructions, key data and the like.

What is claimed is:

1. A pre-recorded magnetic video tape having a synchronization track, said synchronization track comprising a plurality of first magnetic recordings each corresponding to a synchronization signal; and a plurality of second magnetic recordings each corresponding to a code signal, each of said second recordings at least partially overlapping a respective first recording, and at least one pair of overlapping recordings having a dimensional characteristic different from another pair of overlapping recordings so that such dimensional characteristic can represent different coded parameters.

2. The tape of claim 1, wherein each pair of overlapping recordings has a dimensional characteristic with one of two predetermined values, each of said predetermined values representing a respective binary value.

3. The tape of claim 1, wherein the length of each of said second recordings exceeds the length of the respective first recording and the second recording of each pair of overlapping recordings has a portion which projects beyond the respective first recording, a predetermined number of said portions forming a data block of coded information.

4. The tape of claim 1 wherein the first and second recordings of said at least one pair have different lengths and the first and second recordings of said other pair have different lengths.

5. The tape of claim 4, wherein the length of the second recording of each of said pairs exceeds the length of the respective first recording.

6. The tape of claim 5, wherein the second recording of said at least one pair has a portion which projects beyond the respective first recording and the second recording of said other pair has a portion which projects beyond the respective first recording, said portions having different lengths each of which represents a respective coded parameter.

7. A pre-recorded magnetic video tape having a synchronization track, said synchronization track comprising a first set of magnetic recordings each of which corresponds to a predetermined magnetization of said track near saturation; and a second set of magnetic recordings, the magnetic recordings of one of said sets corresponding to respective synchronization pulses and the magnetic recordings of the other of said sets corresponding to respective code pulses, and each magnetic recording of said second set at least partially overlapping, and having the same direction of magnetization as, a respective magnetic recording of said first set so that the areas of said synchronization track corresponding to the regions of overlap having a magnetization exceeding said predetermined magnetization, each pair of overlapping magnetic recordings having one of two different lengths which respectively represent different binary values.

* * * * *